United States Patent [19]

Woodbrey et al.

[11] Patent Number: 4,546,147
[45] Date of Patent: * Oct. 8, 1985

[54] COMPOSITIONS OF NYLON AND ELASTOMERS

[75] Inventors: James C. Woodbrey, Chesterfield, Mo.; Marlowe V. Moncur, Irvine, Calif.; Ross M. Hedrick, St. Louis, Mo.

[73] Assignee: Monsanto Company, St. Louis, Mo.

[ * ] Notice: The portion of the term of this patent subsequent to Aug. 24, 1999 has been disclaimed.

[21] Appl. No.: 440,772

[22] Filed: Nov. 10, 1982

[51] Int. Cl.$^4$ .......................... C08F 8/30; C08L 63/00
[52] U.S. Cl. ..................................... 525/183; 525/184; 525/407; 525/417; 525/431
[58] Field of Search ............... 525/408, 417, 183, 184, 525/431, 407

[56] References Cited

U.S. PATENT DOCUMENTS 4,346,200  8/1982  Woodbrey ........................ 525/408

Primary Examiner—John C. Bleutge
Assistant Examiner—A. L. Carrillo
Attorney, Agent, or Firm—Linda L. Lewis; R. Bruce Blance; William J. Farrington

[57] ABSTRACT

The present invention provides compositions which comprise a blend of: p0 (a) from about 10 to about 97 percent by weight of the composition of a polyamide resin having a minimum molecular weight of about 5,000; p0 (b) from about 3 to about 90 percent by weight of the composition of an elastomeric polymer which (1) is selected from a group consisting of poly(ethylene oxide), poly(propylene oxide), polycaprolactone, polytetrahydrofuran, polybutadiene, polyisoprene, polyisobutylene, poly($C_1$–$C_8$ alkylene acrylate), poly($C_1$–$C_4$ dialkylene siloxane), poly(ethylene-co-propylene), poly(ethylene-co-carbon monoxide), polyethylene-co-vinyl chloride, and poly(ethylene-co-vinyl acetate) polymers and copolymers and combinations thereof; and (2) contains a minimum of about 0.055 milliequivalents of acyllactam groups per gram of said elastomeric polymer.

20 Claims, No Drawings

COMPOSITIONS OF NYLON AND ELASTOMERS

BACKGROUND OF THE INVENTION

1. Field of the Invention

This invention relates to thermoplastic polyamide compositions, and more particularly to thermoplastic compositions comprising blends of a polyamide and an elastomer and methods of making the same.

2. Description of the Prior Art

Blends of different polymers can result in compositions which exhibit a valuable combination of properties which frequently is not obtainable by either polymer alone. However, frequently polymers are incompatible with each other and it is difficult to obtain a uniform blend and desirable properties.

There is considerable prior art related to blends of polyamides and elastomer materials. By incorporating elastomeric or rubbery materials in polyamides an improvement in the impact strength of the polyamide has been realized.

U.S. Pat. No. 4,174,358 issued Nov. 13, 1979 to B. N. Epstein discloses polyamide compositions modified with another polymer of tensile modulus less than 20,000 psi of which various elastomeric materials are exemplified. A requirement of the polymer which is dispersed in the polyamide matrix is that it be adhered to the polyamide and at least one of various adherent sites which are disclosed must be present in the polymer modifier.

In U.S. Pat. No. 3,236,914 issued Feb. 22, 1966 to J. B. Murdock et al there is disclosed an improved method for obtaining homogeneous blends of rubbery copolymers with hard saturated resinous polymers such as polyamides. The method comprises providing free carboxylic acid groups in the rubbery copolymer material whereby improved compatibility with the polyamide is attained.

In U.S. Pat. No. 4,207,404 issued June 10, 1980 to A. Y. Coran et al, homogeneous blends of nylon and chlorinated polyethylene rubber are disclosed.

SUMMARY OF THE INVENTION

The present invention provides compositions which comprise a blend of:
(a) from about 10 to about 97 percent by weight of the compositions of a polyamide resin having a minimum molecular weight of about 5,000;
(b) from about 3 to about 90 percent by weight of the composition of an elastomeric polymer which
 (1) is selected from a group consisting of poly(ethylene oxide), poly(propylene oxide), polycaprolactone, polytetrahydrofuran, polybutadiene, polyisoprene, polyisobutylene, poly($C_1$–$C_8$ alkylene acrylate), poly($C_1$–$C_4$ dialkylene siloxane), poly(ethylene-co-propylene), poly(ethylene-co-carbon monoxide), polyethylene-co-vinyl chloride, and poly(ethylene-co-vinylacetate) polymers and copolymers and combinations thereof; and
 (2) contains a minimum of about 0.055 milliequivalent of acyllactam groups per gram of said elastomeric polymer.

The acyllactam groups present in the Component (b) polymer results in an improvement in the compatibility between that polymer and the polyamide resin. By intimately mixing of the just-described blends, thermoplastic compositions are obtained wherein the elastomer is adhered to the polyamide matrix through the acyllactam groups. Preferred compositions which comprise more than 50% by weight of polyamide resin and incorporate a Component (b) elastomeric polymer in accordance with the present invention exhibit improved impact resistance as compared to the polyamide resin alone.

DETAILED DESCRIPTION OF THE INVENTION

The polyamide resin employed in the compositions of the present invention is well known in the art and embraces those semi-crystalline and amorphous resins having a molecular weight of at least 5,000 and commonly referred to as nylons. Suitable polyamides include those described in U.S. Pat. Nos. 2,071,250; 2,071,251; 2,1130,523; 2,130,948; 2,241,322; 2,312,966; 2,512,606; and 3,393,210. The polyamide resin can be produced by condensation of equimolar amounts of a saturated dicarboxylic acid containing from 4 to 12 carbon atoms with a diamine, in which the diamine contains from 4 to 14 carbon atoms. Excess diamine can be employed to provide an excess of amine end groups over carboxyl end groups in the polyamide. Examples of polyamides include poly(hexamethylene adipamide) (66 nylon), poly(hexamethylene azelaamide) (6,9 nylon), poly(hexamethylene sebacamide) (6,10 nylon), and poly(hexamethylene dodecanoamide) (6,12 nylon), poly(bis-paraaminocyclohexyl methane dodecanoamide) poly(11-aminoundecanoic acid), and the polyamide produced by the ring opening of lactams, i.e., polycaprolactam, polylaurylactam. It is also possible to use in this invention polyamides prepared by the copolymerization of two or more of the above polymer components, e.g., for example, an adipic, isophthalic acid hexamethylene diamine copolymer. The compositions of the present invention contain from about 10 to about 97 percent by weight of the polyamide resin. Preferred compositions contain from about 50 percent to about 95 percent by weight of the polyamide resin.

The polyamide resin is blended with an elastomer polymer which (1) is selected from the group consisting of poly(ethylene oxide), poly(propylene oxide) polybutadiene, polyisoprene, polyisobutylene, poly($C_1$–$C_8$ alkylene acrylate), poly($C_1$–$C_4$ dialkylene siloxane), poly(ethylene-co-propylene), poly(ethylene-co-carbon monoxide), poly(ethylene-co-vinyl chloride), and poly(ethylene-co-vinylacetate) polymers and combinations thereof; and (2) contains a minimum of about 0.55 milliequivalents of acyllactam groups per gram of the elastomeric polymer.

It is to be understood that the elastomeric polymers listed in the aforementioned group are not intended to be limited narrowly to specific polymers, but rather are intended to exemplify types of polymers which types would include various comonomeric modifications with monomers other than those in the specifically recited units so long as the polymer comprise greater than 50 percent by weight and preferably 70 percent by weight of the specifically recited units. Of course, it would be desirable for the comonomeric modification to result in elastomeric polymers which can be effectively blended with the polyamide resin component of the composition of the present invention. Comonomeric modifications would be well known to those skilled in the art. Examples of such comonomeric modifications are poly(ethylene-co-propylene-co-diene monomer), poly(propylene oxide-co-alkylene glycidyl ether), poly(propylene oxide-co-allyl glycidyl ether), poly(2-ethyl hexyl acrylate-co-butyl methacrylate), and poly(butylacrylate-co-acrylonitrile). The elastomeric polymer may also be a combination of two or more polymers of the aforementioned types or mixtures thereof, such as poly(butadiene-co-isoprene), poly(propylene oxide-co-ethylene oxide), or mixtures of poly(butyl acrylate) and poly(2-ethyl butyl acrylate) or of polybutadiene with poly(butadiene-co-isoprene).

Those skilled in the art would recognize a wide variety of other modifications possible to the polymers listed in the aforementioned group.

The elastomeric polymer contains a minimum of about 0.055 milliequivalents of acyllactam groups per gram of elastomeric polymers. Preferably the elastomeric polymer contains a minimum of about 0.11 milliequivalents and, more preferably, between about 0.11 and about 0.28 milliequivalents of acyllactam groups per gram of elastomeric polymers.

It should be noted that the term "acyllactam" groups as used herein shall include acyllactam groups having the general structure

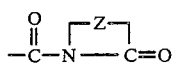

wherein Z is an alkylene, and acyclic species derived therefrom such as imide groups

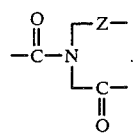

The acyllactam groups may be incorporated in the elastomeric polymers by various methods known to those skilled in the art. For example, N-acryloyl lactam can be directly copolymerized with other monomers to form such an elastomer. Alternatively, N-acryloyl lactam can be grafted on an elastomer containing unsaturation. Still another method is to prepare an elastomer with functionality which would allow for modification with a lactam material. Examples of these last-stated methods are the modification of a carboxyl-functional elastomer with a lactam and the modification of hydroxyl-functional elastomers with a bis-acyllactam. Preferably, the acyllactam groups are derived from caprolactam.

Preferred for use in the compositions of the present invention are acyllactam comprising poly(ethylene-co-alkylene acrylates), poly(ethylene-co-propylenes), poly($C_4$-$C_8$ alkylene acrylates), poly(propylene oxides), polytetrahydrofurans, and polybutadienes.

The acyllactam groups improves the compatibility between the polyamide and elastomeric polymer. It is believed that these groups react with amine or amide groups in the polyamide resin. However, this theory should in no means be taken to limit the scope of the present invention.

Preferably, Z is an alkylene having from 3 to 14 carbon atoms. Imide groups and other acyclic species are typically incorporated intralinear into the elastomeric polymer branch points while the acyllactam groups are typically pendant or terminal. Reference herein to amounts of acyllactam groups means the collective amount of all species derived therefrom as described.

Compositions of the present invention comprise a blend of from about 10 to about 97 percent by weight of the Component (a) polyamide and from about 3 to about 90 percent by weight of the Component (b) elastomeric polymer, said percents by weight being of the total weight of the composition, excluding particulate or fibrous fillers, reinforcements, pigments, or other such additives. More preferably compositions are comprised of from about 20 to about 80 percent by weight of the Component (a) polyamide and from about 20 to about 80 percent by weight of the Component (b) elastomeric polymer. The present invention also encompasses compositions comprising the product resulting from intimately blending Components (a) and (b) wherein the Component (a) polyamide resin and the Component (b) elastomeric polymer are present in such compositions at the same above-stated amounts.

Other ingredients may be included in the compositions of the present invention and may be introduced with Component (a) or (b), introduced as a separate component during the blending of (a) and (b), introduced as a separate component after (a) and (b) are blended, or otherwise so long as the ingredient and the manner of introduction do not interfere with the compatibility between Components (a) and (b). Typical ingredients which might be desirable in a composition of the present invention for use as a molding resin include stabilizers and inhibitors of oxidative, thermal, and ultraviolet light degradation, lubricants and mold release agents, colorants, fillers and reinforcing agents, nucleating agents, plasticizers, flame retardant agents, etc. Generally, such additives will comprise less than 60 percent by weight of a composition within the present invention.

EXAMPLES 1–5

Preparation of Acyllactam Functionalized Elastomers

Elastomers containing acyllactam functionality were prepared from the monomers butyl acrylate (BA), ethyl acrylate (EA), and acryloylcaprolactam (ACLM). The monomers were polymerized in a suspension process under typical conditions for acylate polymerization. The elastomers thus prepared were terpolymers containing approximately the weight percent of monomer residues shown in Table I.

TABLE I

| ELASTOMER COMPOSITIONS | | | | | |
| --- | --- | --- | --- | --- | --- |
| | Example | | | | |
| | 1 | 2 | 3 | 4 | 5 |
| Weight % BA | 79 | 78 | 77 | 76 | 75 |
| Weight % EA | 20 | 20 | 20 | 20 | 20 |
| Weight % ACLM | 1 | 2 | 3 | 4 | 5 |

The content of acyllactam groups in milliequivalents per gram of elastomeric polymer of Examples 1–5 is shown in Table II. This content was determined by conventional methods.

TABLE II

| | Example | | | | |
| --- | --- | --- | --- | --- | --- |
| | 1 | 2 | 3 | 4 | 5 |
| Acyllactam | 0.055 | 0.11 | 0.17 | 0.22 | 0.28 |

EXAMPLES 6-13

Preparation of Nylon and Elastomeric Compositions

Examples 6-13 were prepared by blending the elastomers prepared in Examples 1-5 with nylon 6,6 (number avg. Mol. Wt. about 12,000 by (4 passes) at about 290° C. Test specimens of the Examples were injection molded from the respective blend compositions using a commercial reciprocating-screw injection molding machine. These specimens were tested in the dry-as-molded state in accordance with the methods listed below with the results reported in Table III. A control Example 6 of nylon 6,6 was also tested in accordance with the same methods for comparison.

TEST METHODS

Izod Impact Strength—ASTM D-256-56, Method A with 3.2 mm thick specimen. [Units are in Joules/meter notch.]

Tensile Properties (Strength and Elongation)—ASTM D-638-68, using 3.2 mm thick Type I specimens with 50 mm gauge length and 5 mm/min. cross-head rate. [Units are in kgf/cm$^2$ for Tensile Strength and % for Elongation.]

TABLE III

| EXAMPLE | ELASTOMER | WEIGHT % NYLON 6,6/ELAST. | IZOD, (J/m Notch) | TENSILE STRENGTH (kgf/cm$^2$) | TENSILE ELONG. (%) | FLEXURAL MODULUS (kgf/cm$^2$) |
|---|---|---|---|---|---|---|
| 6 (Control) | NONE | 100/0 | 60 | 77 | 80 | 2861 |
| 7 | Ex. 1 | 80/20 | 214 | 55 | 52 | 1979 |
| 8 | Ex. 2 | 80/20 | 857 | 54 | 56 | 1910 |
| 9 | Ex. 3 | 80/20 | 958 | 55 | 60 | 1896 |
| 10 | Ex. 4 | 80/20 | 937 | 54 | 67 | 1841 |
| 11 | Ex. 5 | 80/20 | 304 | 53 | 72 | 1834 |
| 12 | Ex. 2 | 75/25 | 1025 | 39 | 87 | 1717 |
| 13 | Ex. 2 | 90/10 | 144 | 63 | 36 | 2461 |

Flexural Modulus—ASTM D-790-66 using 3.2 mm thick by 12.7 mm wide by 130 mm long test specimens and 1.3 mm/minute cross-head or deflection rate. [Units are in kgf/cm$^2$.]

As can be seen from the above Table III compositions in accordance with the present invention, Examples 7-13, have improved impact (Izod) than the corresponding pure nylon, Example 6. The following Examples 14 and 15 further emphasize this improved impact for other nylons.

EXAMPLE 14

Elastomer as prepared in Example 2 was blended with nylon 6 at a 20% level by the method described in the previous Examples 7-13. The Izod impact in accordance with the previously described method was 753 J/m as compared to 69 J/m for a control specimen of nylon 6 unmodified.

EXAMPLE 15

Elastomer as prepared in Example 2 was blended with nylon 6,9 at a 20% level by the method described in the previous Examples 7-13. Izod impact in accordance with the previously described method was 913 J/m as compared to 54 J/m for a test specimen of nylon 6,9 unmodified.

While the preferred embodiments of the present invention have been described and illustrated, various modifications or substitutions can be made thereto without departing from the spirit and scope of the invention. Accordingly, it is to be understood that the present invention has been described by way of illustration and not limitation.

What is claimed is:

1. A composition comprising a blend of:
   (a) from about 10 to about 97 percent by weight of the composition of a polyamide resin having a minimum molecular weight of about 5,000; and
   (b) from about 3 to about 90 percent by weight of the composition of an elastomeric polymer which:
   (1) is selected from the group consisting of polyethylene oxide, polypropylene oxide, polycaprolactone, polytetrahydrofuran, polybutadiene, polyisoprene, polyisobutylene, poly($C_1$-$C_8$ alkylene acrylate), poly($C_1$-$C_4$ dialkylene siloxane), poly(ethylene-co-propylene), poly(ethylene-co-carbon monoxide), polyethylene-co-vinyl chloride, and poly(ethylene-co-vinyl acetate) polymers and combinations thereof;
   (2) contains a minimum of about 0.055 milliequivalents of acyllactam groups having the general formula

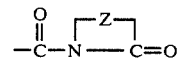

or acyclic derivatives thereof per gram of said elastomeric polymer, wherein Z is alkylene having from about 3 to about 14 carbon atoms.

2. The composition of claim 1 wherein said polyamide resin is selected from the group consisting of poly(hexamethylene adipamide), poly(hexamethylene azelaamide), poly(hexamethylene sebacamide), poly(hexamethylene dodecanoamide), poly(bis-paraaminocyclohexylmethane dodecanoamide), poly (11-aminoundecanoic acid), polycaprolactam, polylauryllactum, and copolymers and combinations thereof.

3. The composition of claim 1 wherein said polyamide resin comprises from about 50 to 95 percent by weight of said composition.

4. The composition of claim 2 wherein said polyamide resin is selected from the group consisting of poly(hexamethylene adipamide) and polycaprolactam.

5. The composition of claim 1 wherein said acyllactam group is derived from caprolactam.

6. The composition of claim 1 wherein said elastomeric polymer is selected from the group consisting of polyethylene-co-alkylene acrylates, poly(ethylene-co-polypropylene), poly($C_4$-$C_8$ alkylene acrylates), poly(propylene oxide), polytetrahydrofuran, and polybutadiene.

7. The composition of claim 1 further including fillers, reinforcements, pigments or other additives.

8. The composition of claim 1 wherein said elastomeric polymer contains a minimum of 0.11 milliequivalents of acyllactam groups or acyclic derivatives thereof per gram.

9. The composition of claim 2 wherein said elastomeric polymer contains a minimum of about 0.11 milliequivalents of acyllactam groups or acyclic derivatives thereof per gram.

10. The composition of claim 3 wherein said elastomeric polymer contains a minimum of about 0.11 milliequivalents of acyllactam groups or acyclic derivatives thereof per gram.

11. The composition of claim 4 wherein said elastomeric polymer contains a minimum of about 0.11 milliequivalents of acyllactam groups or acyclic derivatives thereof per gram.

12. The composition of claim 5 wherein said elastomeric polymer contains a minimum of about 0.11 milliequivalents of acyllactam groups or acyclic derivatives thereof per gram.

13. The composition of claim 8 wherein said elastomeric polymer contains between 0.11 and 0.28 milliequivalents of acyllactam groups per gram.

14. The composition of claim 9 wherein said elastomeric polymer contains between 0.11 and 0.28 milliequivalents of acyllactam groups per gram.

15. The composition of claim 10 wherein said elastomeric polymer contains between 0.11 and 0.28 milliequivalents of acyllactam groups per gram.

16. The composition of claim 11 wherein said elastomeric polymer contains between 0.11 and 0.28 milliequivalents of acyllactam groups per gram.

17. The composition of claim 12 wherein said elastomeric polymer contains between 0.11 and 0.28 milliequivalents of acyllactam groups per gram.

18. The composition of claim 1 wherein said Component (a) polyamide comprises from about 20 to about 80 percent by weight of the composition and said Component (b) comprises from about 80 to about 20 percent by weight of the composition.

19. The composition of claim 8 wherein said Component (a) polyamide comprises from about 20 to about 80 percent by weight of the composition and said Component (b) comprises from about 80 to about 20 percent by weight of the composition.

20. The composition of claim 13 wherein said Component (a) polyamide comprises from about 20 to about 80 percent by weight of the composition and said Component (b) comprises from about 80 to about 20 percent by weight of the composition.

* * * * *

UNITED STATES PATENT AND TRADEMARK OFFICE
CERTIFICATE OF CORRECTION

PATENT NO. : 4,546,147
DATED : Oct.8, 1985
INVENTOR(S) : James C. Woodbrey, Marlowe V. Moncur, Ross M. Hedrick It is certified that error appears in the above-identified patent and that said Letters Patent are hereby corrected as shown below:

[57] ABSTRACT line 2 delete "p0"; line 5 delete "p0"

Signed and Sealed this

Twenty-fifth Day of February 1986

[SEAL]

Attest:

DONALD J. QUIGG

Attesting Officer

Commissioner of Patents and Trademarks